(12) United States Patent
Park et al.

(10) Patent No.: US 7,233,102 B2
(45) Date of Patent: Jun. 19, 2007

(54) FIELD EMISSION DEVICE WITH GATE HAVING CYLINDRICAL PART

(75) Inventors: Shang-hyeun Park, Chungcheongnam-do (KR); Hang-woo Lee, Kyungki-do (KR); You-jong Kim, Seoul (KR); Pil-soo Ahn, Kyungki-do (KR)

(73) Assignee: Samsung SDI Co., Ltd., Suwon, Kyungki-do (KR)

( * ) Notice: Subject to any disclaimer, the term of this patent is extended or adjusted under 35 U.S.C. 154(b) by 123 days.

(21) Appl. No.: 10/686,678

(22) Filed: Oct. 17, 2003

(65) Prior Publication Data

US 2004/0080260 A1    Apr. 29, 2004

(30) Foreign Application Priority Data

Oct. 21, 2002    (KR) ...................... 10-2002-0064345

(51) Int. Cl.
*H01J 1/62* (2006.01)
*H01J 63/04* (2006.01)

(52) U.S. Cl. ...................... 313/495; 313/309; 313/336; 313/351

(58) Field of Classification Search ................ 313/495, 313/309, 336, 351
See application file for complete search history.

(56) References Cited

U.S. PATENT DOCUMENTS

| | | | | |
|---|---|---|---|---|
| 5,448,132 A | * | 9/1995 | Komatsu | .................... 313/495 |
| 5,451,830 A | * | 9/1995 | Huang | ........................ 313/309 |
| 5,489,933 A | * | 2/1996 | Betsui et al. | ................ 347/120 |
| 5,509,839 A | * | 4/1996 | Liu | .............................. 445/24 |
| 5,548,181 A | * | 8/1996 | Jones | ......................... 313/309 |
| 5,786,659 A | * | 7/1998 | Takagi et al. | ............... 313/309 |
| 5,942,849 A | * | 8/1999 | Cade | .......................... 313/495 |
| 6,008,576 A | * | 12/1999 | Nakatani et al. | ............ 313/495 |

FOREIGN PATENT DOCUMENTS

| | | |
|---|---|---|
| JP | 7-65706 | 3/1995 |
| JP | 07065706 A * | 3/1995 |
| KR | P1999-0036808 | 5/1999 |

OTHER PUBLICATIONS

*Korean Patent Office Action and English Translation.

* cited by examiner

*Primary Examiner*—Sikha Roy
*Assistant Examiner*—Kevin Quarterman
(74) *Attorney, Agent, or Firm*—Buchanan Ingersoll & Rooney PC

(57) ABSTRACT

The field emission device includes a substrate, a cathode, a gate insulating layer, an electron emitter, and a gate electrode. The cathode is formed on the substrate. The gate insulating layer is formed on the cathode and has a well exposing a portion of the cathode. The electron emitter is formed on the exposed portion of the cathode. The gate electrode is formed on the gate insulating layer and has a gate hole corresponding to the well. The gate electrode further includes a cylindrical electrode part that forms a focusing electric field from the gate hole toward a proceeding path of an electron beam. Accordingly, a focusing electric field can be formed around an electron beam emitted from the electron emitter so as to converge and focus the electron beam passing through the focusing electric field. As a result, color purity, brightness, and durability can be improved.

16 Claims, 18 Drawing Sheets

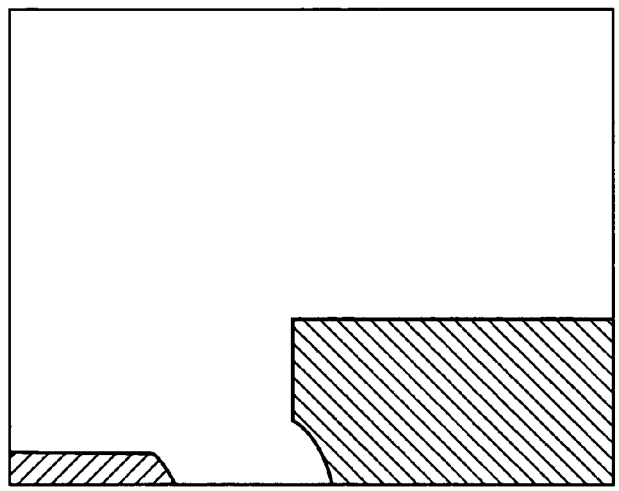
FIG. 7B
PRIOR ART
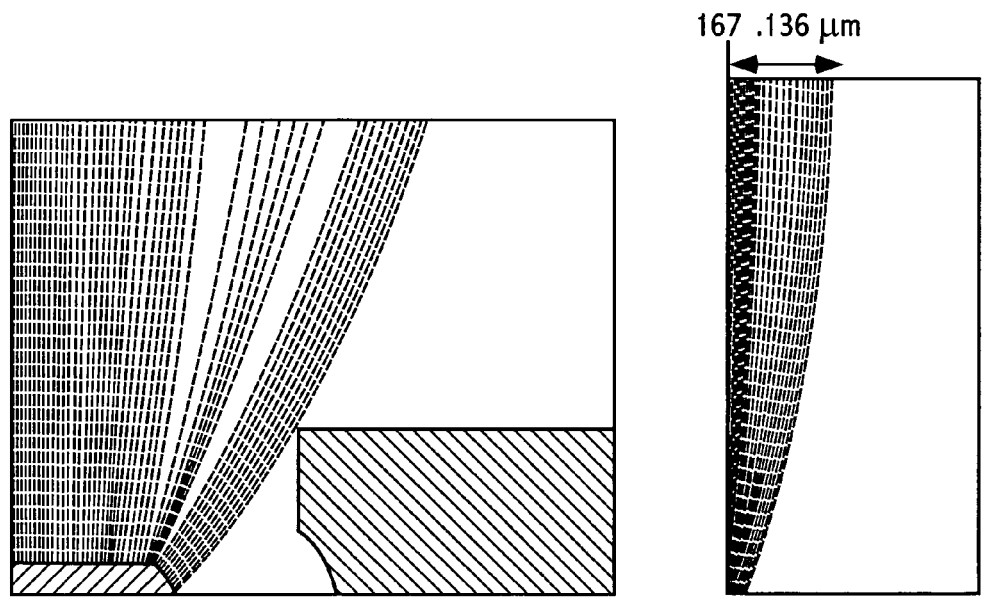
FIG. 7C
PRIOR ART
FIG. 7D
PRIOR ART

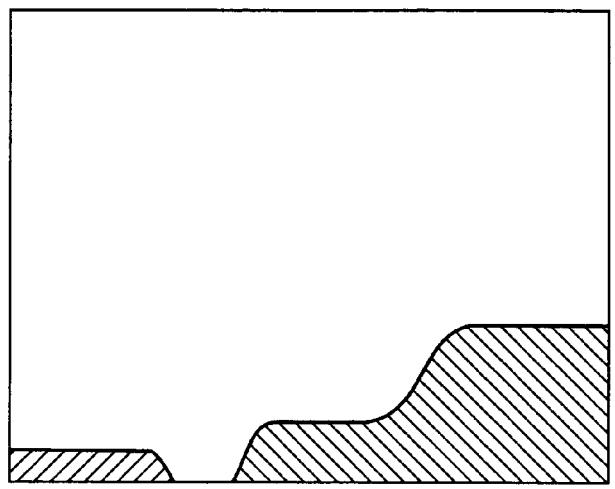
FIG. 8B
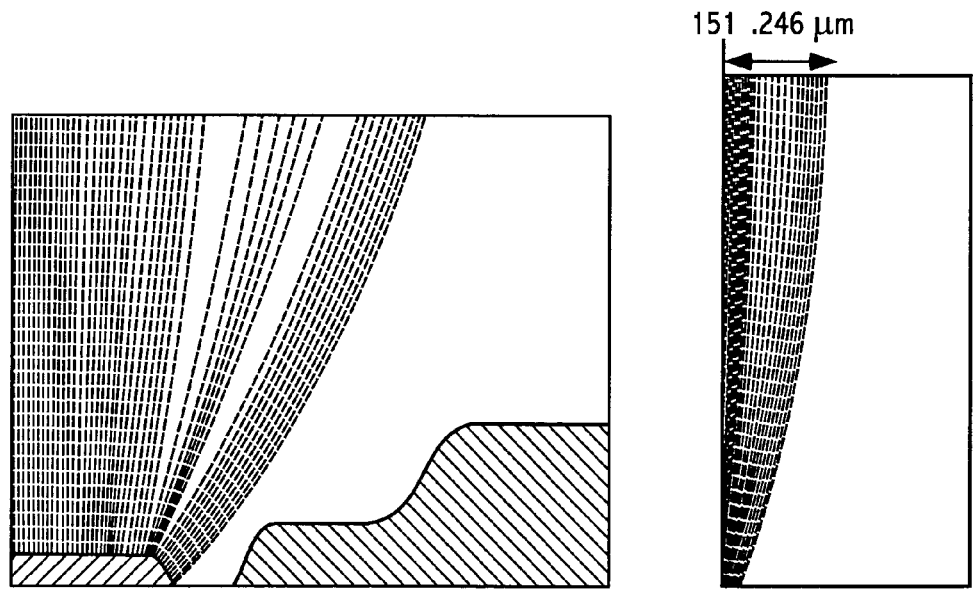
FIG. 8C
FIG. 8D

FIELD EMISSION DEVICE WITH GATE
HAVING CYLINDRICAL PART

BACKGROUND OF THE INVENTION

This application claims the priority of Korean Patent Application No. 2002-64345, filed on Oct. 21, 2002, in the Korean Intellectual Property Office, the disclosure of which is incorporated herein in its entirety by reference.

1. Field of the Invention

The present invention relates to a field emission device, and more particularly, to a field emission device having improved electron emission efficiency, brightness, color purity, and durability due to a focusing electric field.

2. Description of the Related Art

As shown in FIG. 1, in a field emission device (FED) using carbon nanotubes (CNTs), a cathode 2 is formed on a substrate 1, and a gate insulating layer 3 is formed on the cathode 2. The gate insulating layer 3 has a well 3a that exposes a portion of the cathode 2. An electron emitter 4 is formed of carbon nanotubes on the exposed portion of the cathode 2. A gate electrode 5 with a gate hole 5a corresponding to the well 3a is formed on the gate insulating layer 3.

A process of manufacturing a conventional FED having the above-described structure will be described in brief with reference to FIGS. 2A through 2J.

As shown in FIG. 2A, a cathode 2 is formed of a transparent conductive material such as ITO on a substrate 1 made of glass. Actually, a plurality of cathodes 2 are formed in parallel strips. To form the cathode 2, a process of depositing ITO on the entire surface of the substrate 1 and patterning the ITO is performed.

Referring to FIG. 2B, a first insulator 3' is coated on the cathode 2, and then heated. Thereafter, a second insulator 3" having a lower etching rate to an etchant than the first insulator 3' is coated on the first insulator 3', and then heated. As a result, a gate insulating layer 3 having a thickness of about 10 microns is completed.

As shown in FIG. 2C, chromium (Cr) is deposited on the gate insulating layer 3 to form a gate electrode 5.

As shown in FIG. 2D, a photoresist layer 6 is coated on the gate electrode 5. Thereafter, as shown in FIG. 2E, the photoresist layer 6 is patterned to form a window 6a corresponding to a gate hole 5a and a well 3a in the photoresist layer 6. Next, a portion of the gate electrode 5 exposed by the window 6a is dry etched.

Referring to FIG. 2F, an etchant is supplied through the window 6a to etch the gate insulating layer 3. Here, since the first insulator 3' of the gate insulating layer 3 has a higher etching rate than the second insulator 3" of the gate insulating layer 3, the well 3a shown in FIG. 2F is formed.

As shown in FIG. 2G, the gate electrode 5 is patterned to broaden the gate hole 5a. Due to patterning of the gate electrode 5, the gate electrode 5 on the gate insulating layer 3 is divided into a plurality of gate electrodes which are arranged in parallel strips.

Referring to FIG. 2H, a photoresist 7 is properly coated on the gate electrode 5, and then patterned so that a portion of the cathode 2 in the center of the floor of the well 3a is exposed.

As shown in FIG. 2I, a CNT paste 4a containing photoresist is coated on the photoresist 7. Here, the CNT paste 4a fills the well 3a.

Referring to FIG. 2J, an exposure and development process is performed using a pattern mask (not shown) so that the CNT paste 4a remains in the center of the floor of the well 3a. As a result, an electron emitter 4 is formed on the cathode 2.

Through the above-described process, a lower substrate including an electron gun structure having a cathode, a gate electrode, and so forth is completed. Next, the lower substrate is heated, and then sealed to a front substrate, which is coated with R, G, and B fluorescent materials, with a predetermined gap between the two substrates.

In the electron gun structure shown in FIG. 1 or FIG. 2J, an electron beam emitted from the electron emitter 4 diverges due to mutual repulsion of electrons in the electron beam and a strong electric field is formed by applying a positive voltage to the gate electrode 5. As a result, the electron beam is defocused, which increases the size of a spot formed on the fluorescent material. Then, the electron beam lands on other regions adjacent to its intended target fluorescent material. Thus, color purity is degraded, which results in poor image quality. Also, as the positive voltage of the gate electrode 5 increases, the electron beam further diverges after exiting the gate hole 5a. Thus, most of the intensity of the electron beam radiated onto a fluorescent material is at the periphery of a corresponding pixel. If divergence of the electron beam is not minimized, load on the electron emitter 4 increases during high current driving or a long driving period, thereby reducing the life span of the electron gun structure.

These problems occur in a spint type FED using metal micro tips as an electron emitter. Thus, for the spint type FED, a method of forming a double gate was introduced in order to reduce divergence of the electron beam. However, as is known, the spint type FED has a complicated structure, is not suitable as a wide-screen FED, and is expensive.

SUMMARY OF THE INVENTION

Accordingly, embodiments of the present invention provide an FED capable of effectively focusing an electron beam emitted from an electron emitter.

Embodiments of the present invention provide a FED having improved color purity and clearness due to effective focusing of an electron beam.

According to an aspect of the present invention, there is provided a field emission device including a substrate, a cathode, a gate insulating layer, an electron emitter, and a gate electrode. The cathode is formed on the substrate. The gate insulating layer is formed on the cathode and has a well exposing a portion of the cathode. The electron emitter is formed on the exposed portion of the cathode. The gate electrode is formed on the gate insulating layer and has a gate hole corresponding to the well. The gate electrode further includes a cylindrical electrode part that forms a focusing electric field from the gate hole toward a proceeding path of an electron beam.

It is preferable that the cylindrical electrode part is a Bellmouse type electrode part that broadens in the direction of propagation of the electron beam.

The electron emitter is micro tips or carbon nanotubes.

According to another aspect of the present invention, there is also provided a method of manufacturing a field emission device. A first insulating layer and a second insulating layer having a higher etching rate than the first insulating layer are sequentially coated on a substrate on which a cathode is formed, to form a gate insulating layer. A first mask having a window with a predetermined diameter is formed on the gate insulating layer to form a well in the gate insulating layer. An etchant is supplied through the window to form a well that broadens upward in the gate insulating layer beneath the window of the first mask and exposes a portion of the cathode. A gate electrode is deposited on the gate insulating layer. A portion of the gate electrode on the bottom and lower inner wall of the well is removed to form a gate hole corresponding to the cathode in the gate electrode. An electron emitter is formed on the exposed portion of the cathode.

It is preferable that after forming the well, the first mask is removed. Preferably, when removing the portion of the gate electrode, a second mask having a window corresponding to the gate hole is formed, etched, and removed so as to form the gate hole.

It is preferable that a third mask is formed on the gate electrode to expose only a portion of the cathode and cover the remaining area of the cathode so as to form the electron emitter.

It is preferable that after forming the third mask, a carbon nanotube paste containing photoresist is coated, and then patterned by photolithography so as to form the electron emitter.

BRIEF DESCRIPTION OF THE DRAWINGS

The above and other features and advantages of the present invention will become more apparent by describing in detail exemplary embodiments thereof with reference to the attached drawings in which:

FIGS. 7A through 7D are views illustrating results of a simulation carried out for the conventional FED; and FIGS. 8A through 8D are views illustrating results of a simulation carried out for an FED according to the present invention.

DETAILED DESCRIPTION OF THE INVENTION

Hereinafter, an FED and a method of manufacturing the FED according to the present disclosure will be described in detail with reference to the attached drawings. The FED of the present disclosure will be described as having a single gate structure. However, the FED may have a double gate structure without departing from the scope of the present invention.

Figure 1:
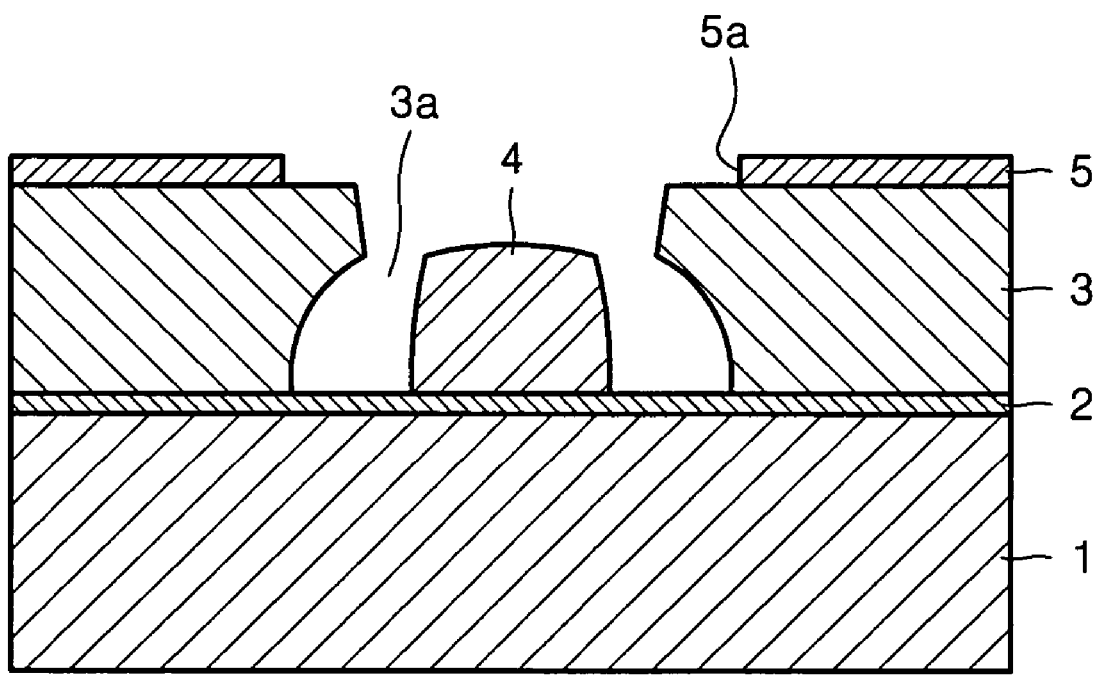
FIG. 1 is a schematic cross-sectional view of a conventional FED.
Figure 2A:
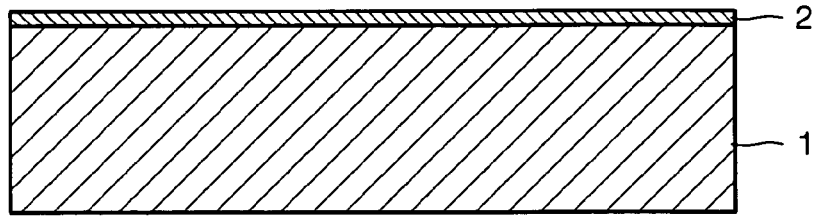
FIGS. 2A through 2J are cross-sectional views for explaining a process of manufacturing the conventional FED shown in FIG. 1.
Figure 2B:
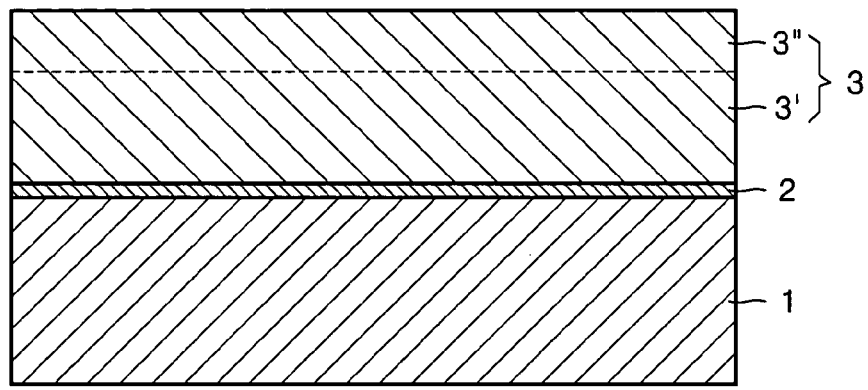
Figure 2C:
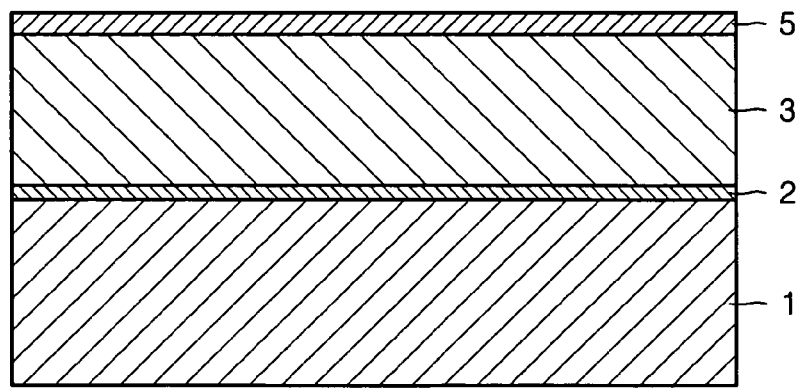
Figure 2D:
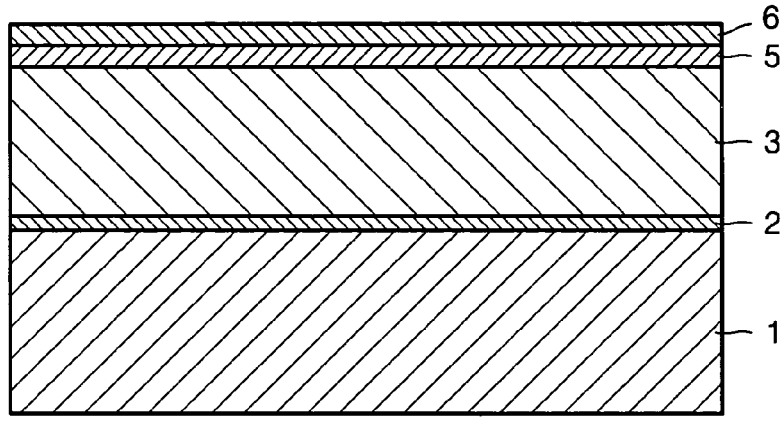
Figure 2E:
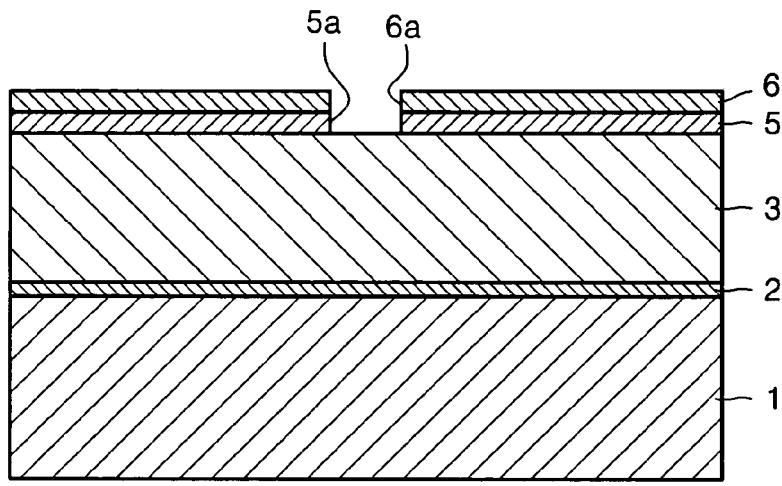
Figure 2F:
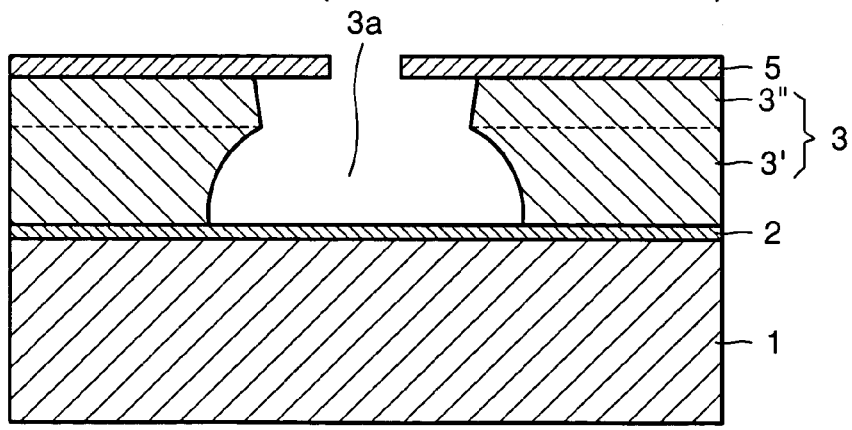
Figure 2G:
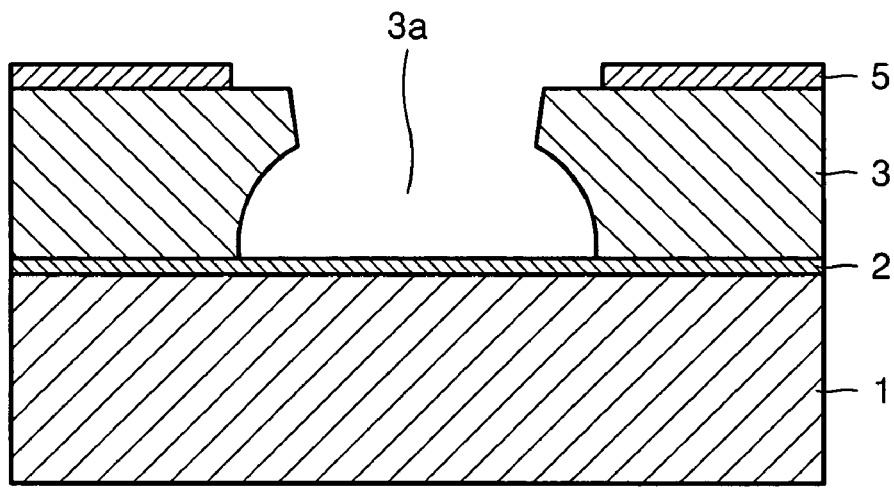
Figure 2H:
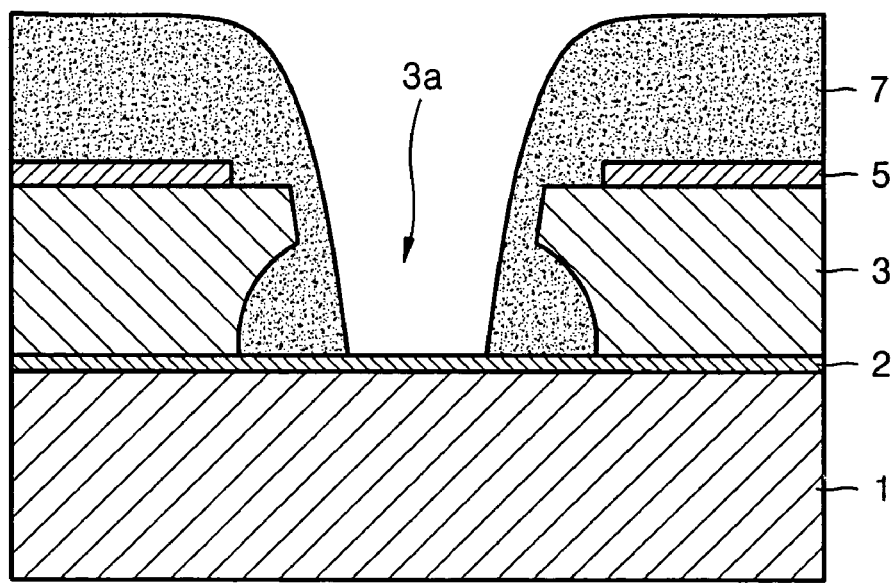
Figure 2I:
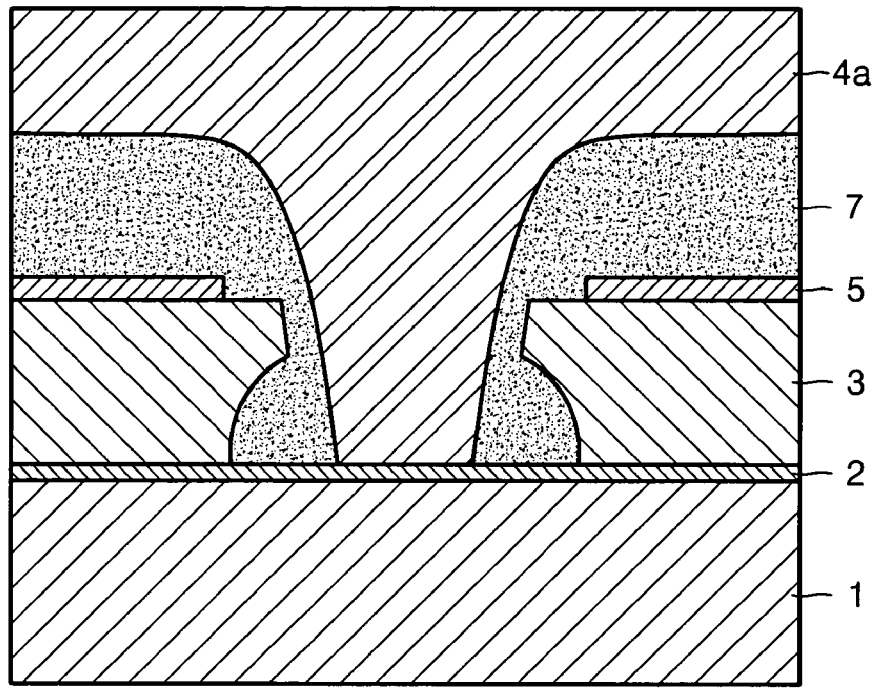
Figure 2J:
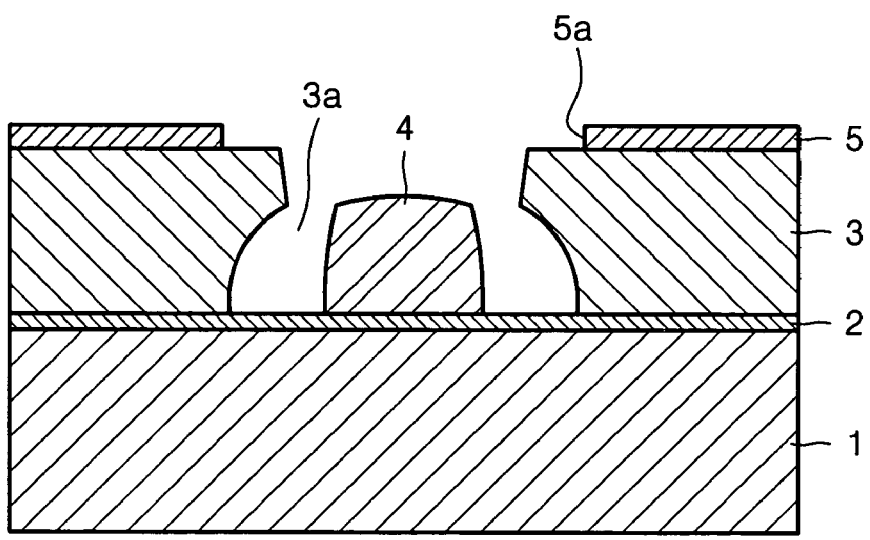
Figure 3A:
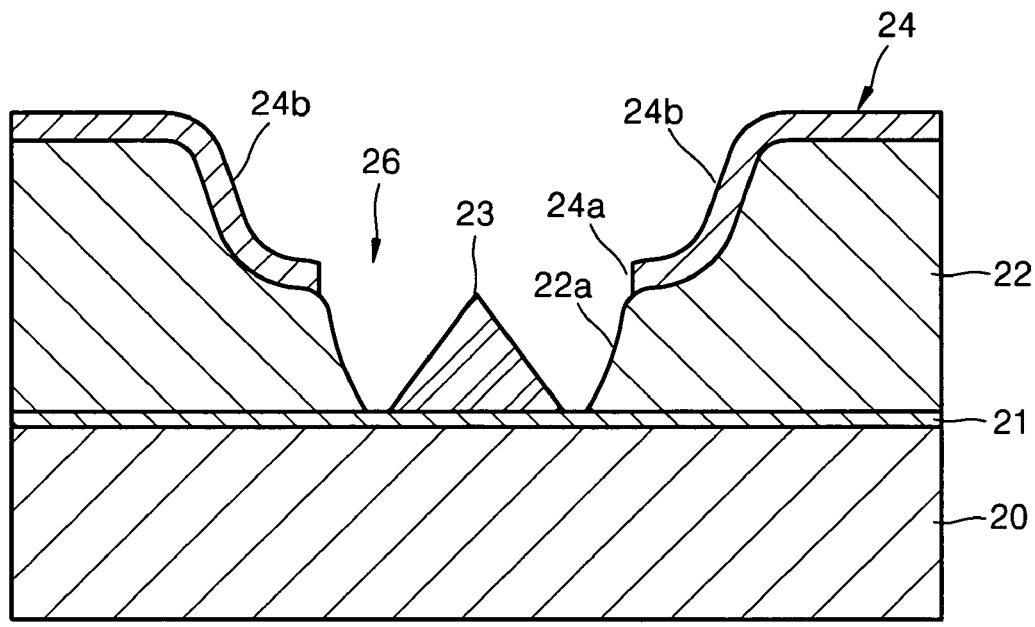
FIG. 3A is a schematic cross-sectional view of a single gate type FED according to an embodiment of the present invention.

FIG. 3A is a schematic cross-sectional view of a single gate type FED using micro tips as an electron emitter according to an embodiment of the present invention. Referring to FIG. 3A, a cathode 21 is formed on a substrate 20. A gate insulating layer 22 is formed on the cathode 21. The gate insulating layer 22 has a well 22a which exposes a portion of the cathode 21. An electron emitter 23 is formed of micro tips on the exposed portion of the cathode 21. A gate electrode 24, which has a gate hole 24a corresponding to the well 22a, is formed on the gate insulating layer 22.

Figure 5:
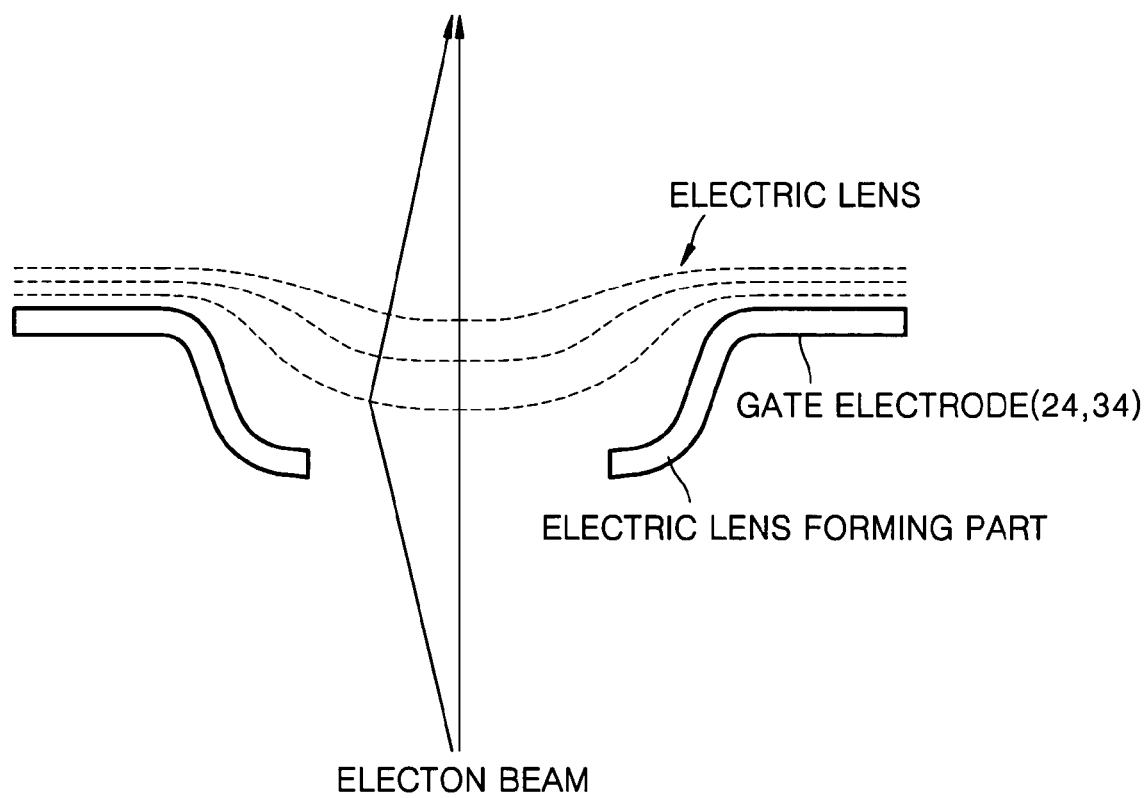
FIG. 5 is a view for explaining the principle of focusing an electron beam by a Bellmouse type electrode part of a gate electrode according to the present invention.

In the above structure, a characteristic part of the exemplary embodiment is a Bellmouse type cylindrical electrode part 24b that forms a focusing electric field around an electron beam passed through the gate hole 24a of the gate electrode part 24. As shown in FIG. 3A, the cylindrical electrode part 24b preferably has a Bellmouse shape which gradually broadens in the direction of electron beam propagation. The cylindrical electrode part 24b forms an electric field that converges or focuses the electron beam emitted from the electron emitter, i.e., the micro tips. FIG. 5 is a view for explaining the principle of forming an electric field using the cylindrical electrode part 24b and focusing an electron beam by the electric field. As shown in FIG. 5, a positive electric lens L, much like an optical convex lens, is formed by the cylindrical electrode part 24b (electric lens forming part). The positive electric lens L serves as a focusing lens that focuses a passing electron beam toward the central beam axis using an electric field. The theory behind the positive electric lens L is general electrodynamics, and thus will not be further described.

Figure 3B:
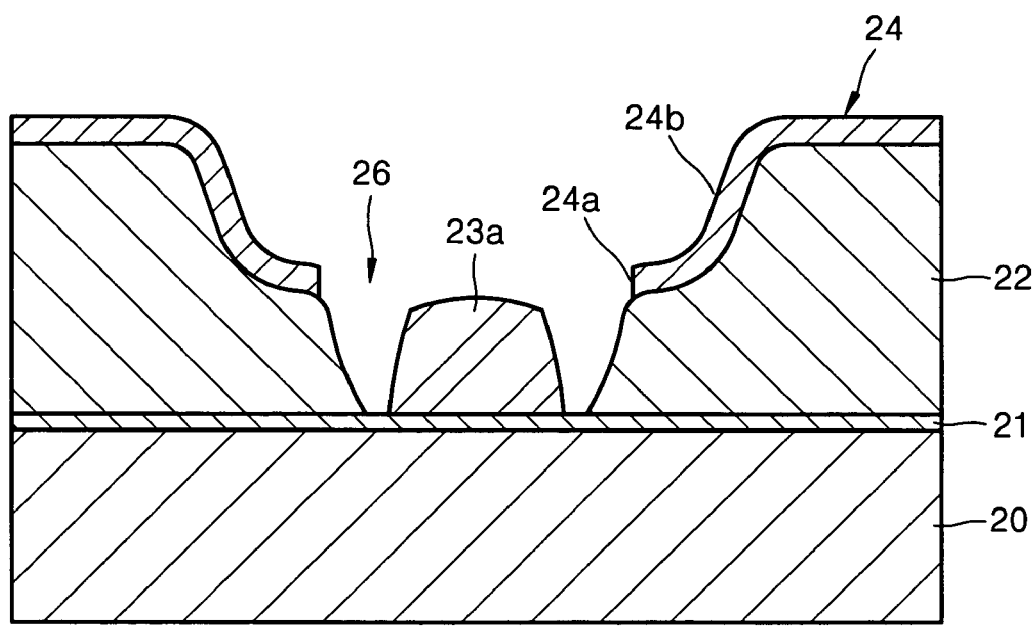
FIG. 3B is a schematic cross-sectional view of a single gate type FED according to another embodiment of the present invention.

FIG. 3B is a schematic cross-sectional view of a single gate type FED using CNTs as an electron emitter. Referring to FIG. 3B, a cathode 21 is formed on a substrate 20. A gate insulating layer 22 is formed on the cathode 21. The gate insulating layer 22 has a well 22a which exposes a portion of the cathode 21. An electron emitter 23a is formed of CNTs on the exposed portion of the cathode 21. A gate electrode 24, which has a gate hole 24a corresponding to the well 22a, is formed on the gate insulating layer 22.

Figure 4A:
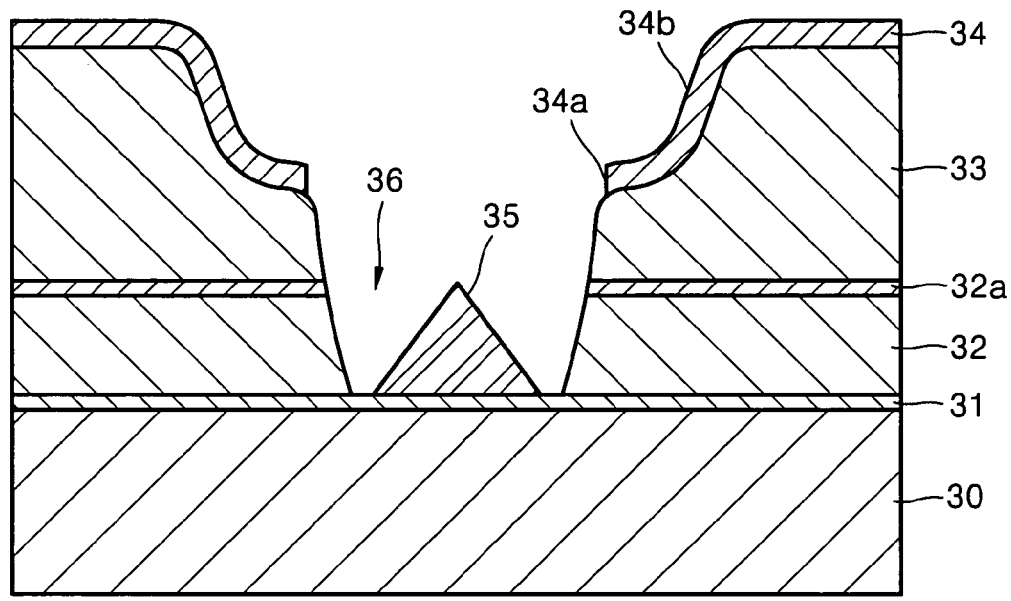
FIG. 4A is a schematic cross-sectional view of a double gate type FED according to an embodiment of the present invention.

FIG. 4A is a schematic cross-sectional view of a double gate type FED using micro tips as an electron emitter according to an embodiment of the present invention. As shown in FIG. 4A, a cathode 31 is formed on a substrate 30. Micro tips, i.e., an electron emitter 35, is formed on the cathode 31. A first gate insulating layer 32 and a second gate insulating layer 33, which form a well 36 enclosing the electron emitter 35, are sequentially stacked on the cathode 31. A first gate electrode 32a is interposed between the first and second gate insulating layers 32 and 33. A second gate electrode 34 having a gate hole 34a corresponding to the well 36 is formed on the second gate insulating layer 33. As described previously, a cylindrical electrode part characterizing the present invention, preferably a Bellmouse type electrode part 34b, is formed at the second gate electrode 34.

Figure 4B:
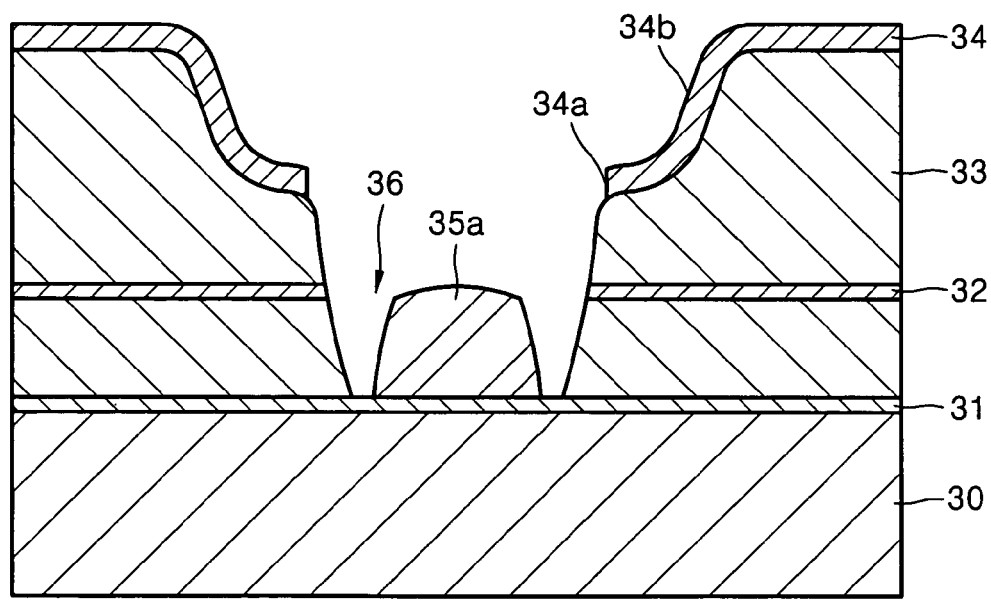
FIG. 4B is a schematic cross-sectional view of a double gate type FED according to another embodiment of the present invention.

A double gate type FED shown in FIG. 4B has an electron emitter 35a formed of CNTs instead of the electron emitter 35 formed of the micro tips shown FIG. 4A. The remaining elements of the double gate type FED shown FIG. 4B are the same as those of the double gate type FED shown in FIG. 4A.

As described above, an FED according to the present disclosure is characterized in that a cylindrical electrode part for forming a focusing electric field, preferably a Bellmouse type electrode part, is formed at a gate electrode. The Bellmouse type electrode part is most effective in a single gate type FED using CNTs as an electron emitter as shown in FIG. 3B. A double gate type FED can effectively focus an electron beam without a cylindrical or Bellmouse type electrode part. However, also in the double gate type FED, a cylindrical or Bellmouse type electrode part characterizing the described embodiment can be formed at a second gate electrode. Thus, an electron beam can be further effectively focused.

Hereinafter, a method of manufacturing the single gate type FED shown in FIG. 3B will be described. Methods of manufacturing FEDs according to other embodiments of the present invention can be easily understood through this description.

Figure 6A:
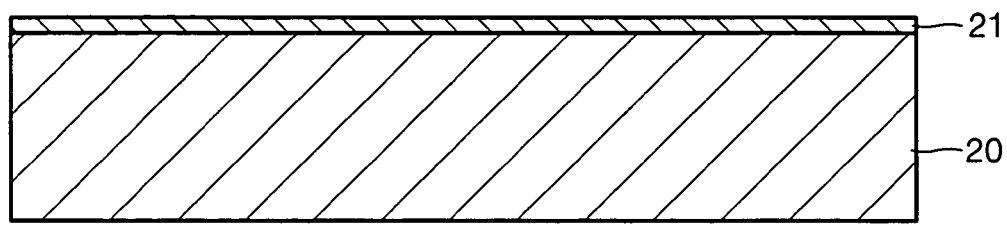
FIGS. 6A through 6L are cross-sectional views for explaining a process of manufacturing the single gate type FED shown in FIG. 3.

As shown in FIG. 6A, ITO is deposited on a substrate 20, and then patterned, thereby forming a cathode 21.

Figure 6B:
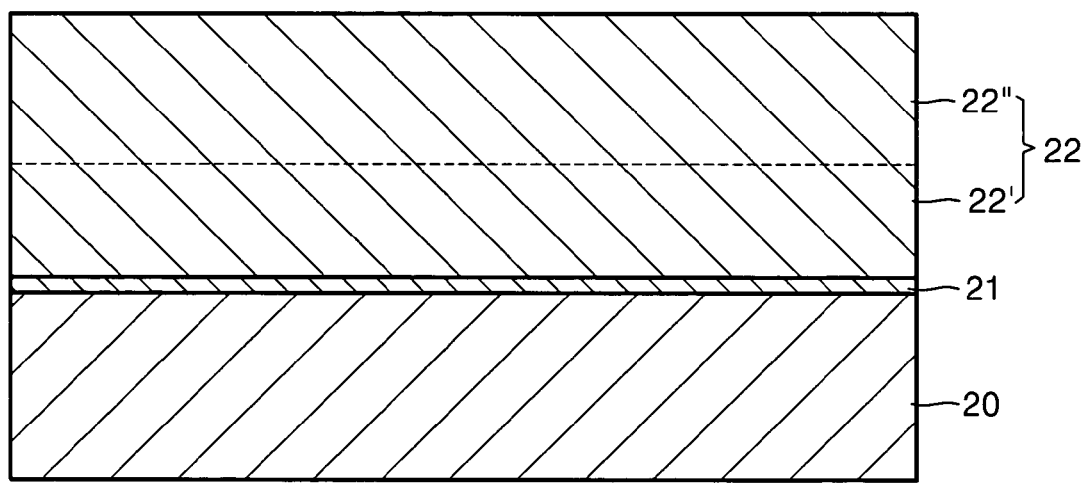

As shown in FIG. 6B, a gate insulating layer 22 is formed on the cathode 21. Here, the gate insulating layer 22 includes first and second gate insulating layers 22' and 22" having different etching rates. The second gate insulating layer 22" has a higher etching rate to an etchant than the first gate insulating layer 22'. Each of the first and second gate insulating layers 22' and 22" undergoes coating and heating processes. For example, the first gate insulating layer 22' is formed of 7870K of Noritake Co. to a thickness of about 5 microns, and the second gate insulating layer 22" is formed of 7972C of Noritake Co. to a thickness of about 10 microns.

Figure 6C:
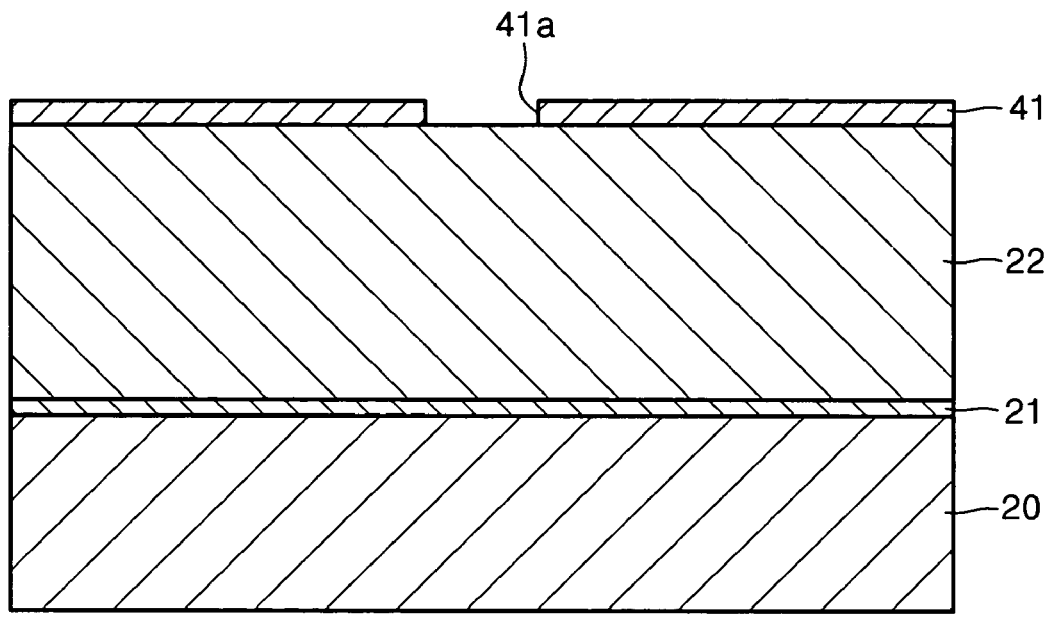

As shown in FIG. 6C, a photoresist mask 41 having a window 41a necessary for forming a well of a gate is coated on the gate insulating layer 22.

Figure 6D:
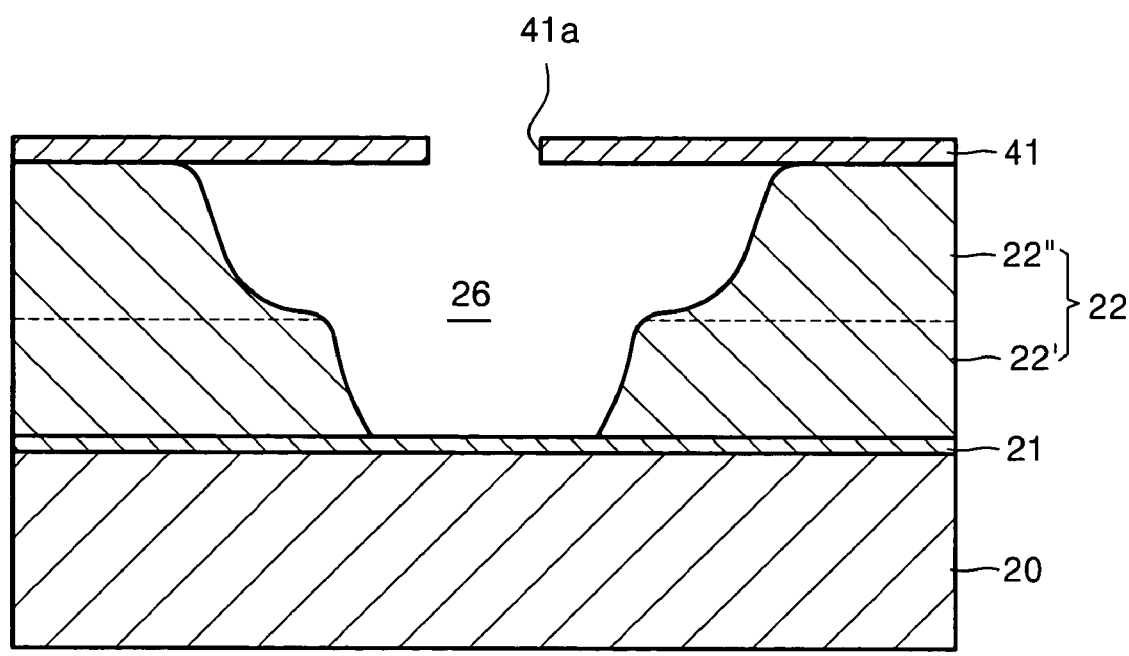

As shown in FIG. 6D, a Bellmouse-shaped well 26 is formed by supplying an etchant through the window 41 a of the photoresist mask 41. The Bellmouse-shaped well 26 broadens upward due to a difference between the etching rates of the first and second gate insulating layers 22' and 22".

Figure 6E:
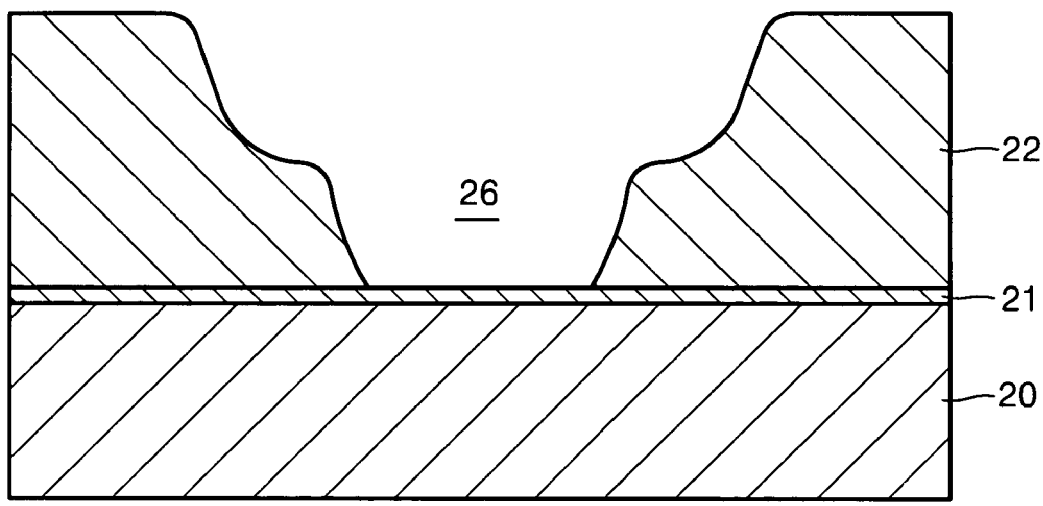
Figure 6F:
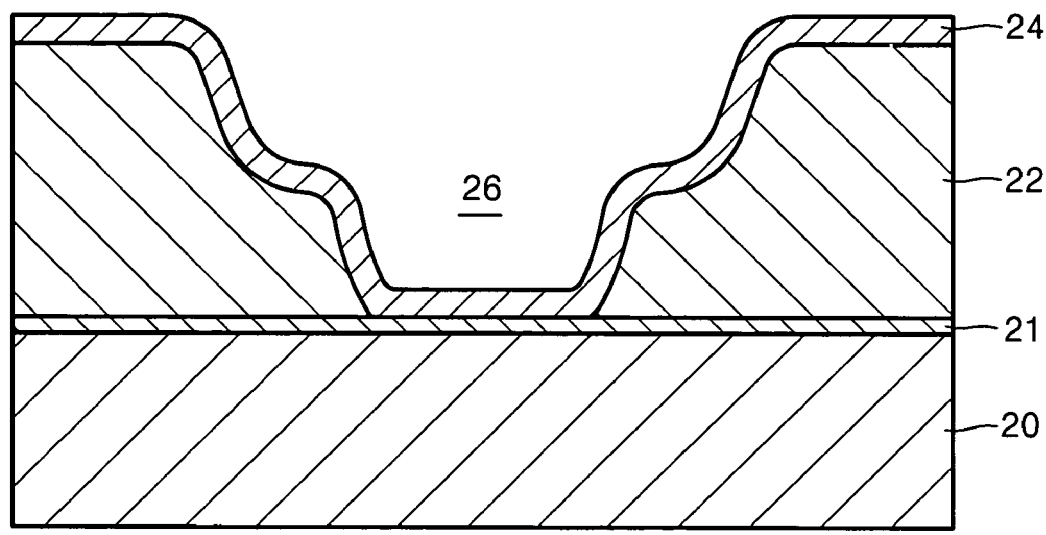

As shown in FIG. 6E, the photoresist mask 41 is stripped by ashing. Next, as shown in FIG. 6F, a gate electrode 24 is formed on the gate insulating layer 22 using a sputtering method.

Figure 6G:
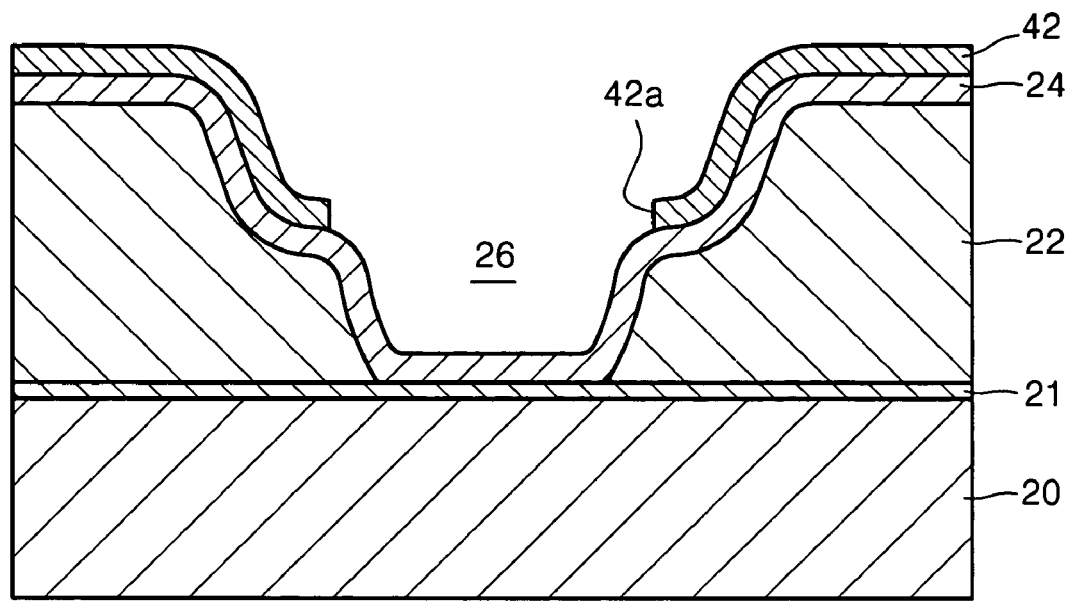

As shown in FIG. 6G, a photoresist mask 42 is formed on the gate electrode 24, and then patterned, thereby forming a window 42a that is opened to expose the floor and lower inner wall of the Bellmouse-shaped well 26. Here, the photoresist mask 42 has a pattern necessary for forming the window 42a and the gate electrode 24. In the present embodiment, the first gate insulating layer 22' and the window 42 are further formed.

Figure 6H:
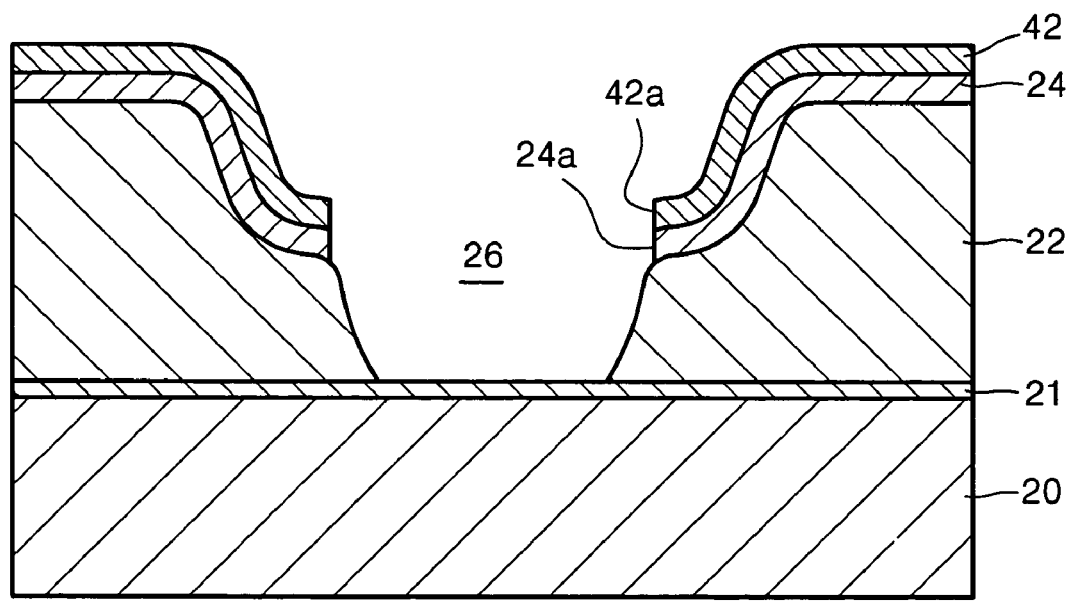

As shown in FIG. 6H, the gate electrode 24 is patterned by wet or dry etching using the photoresist mask 42 to form a gate hole 24a corresponding to the window 42a in the gate electrode 24. During this patterning process, the gate electrode 24 is divided into a plurality of patterns as in a general patterning process.

Figure 6I:
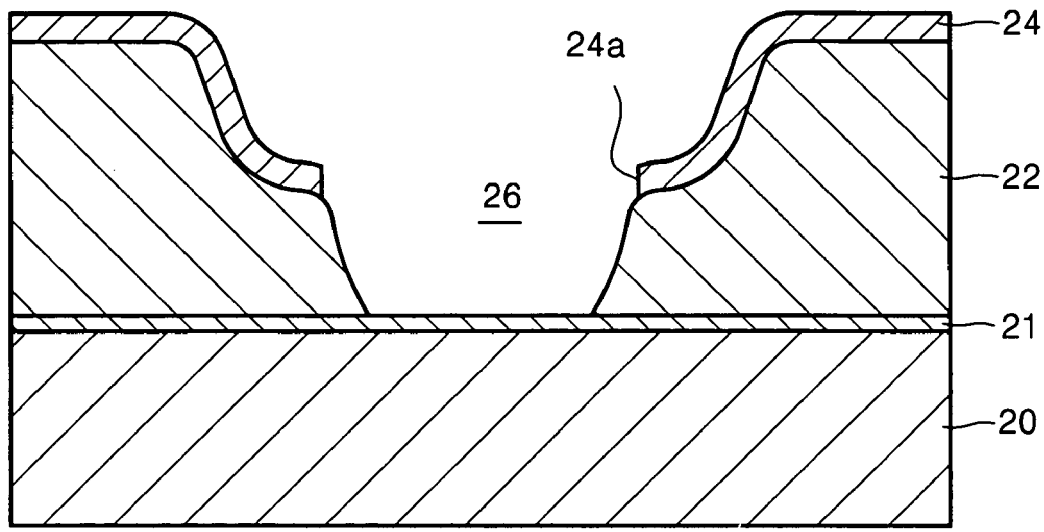
Figure 6J:
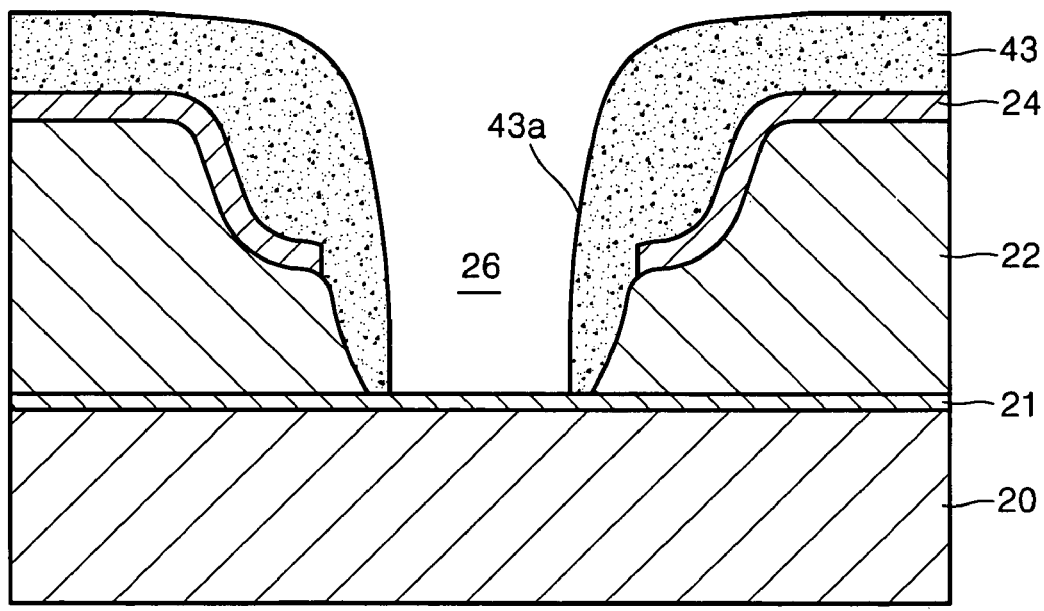

As shown in FIG. 6I, the photoresist mask 42 is stripped by ashing. Thereafter, as shown in FIG. 6J, a photoresist mask 43 is formed. The photoresist mask 43 is spin coated and patterned to form a well-shaped window 43a exposing the floor of the Bellmouse-shaped well 26.

Figure 6K:
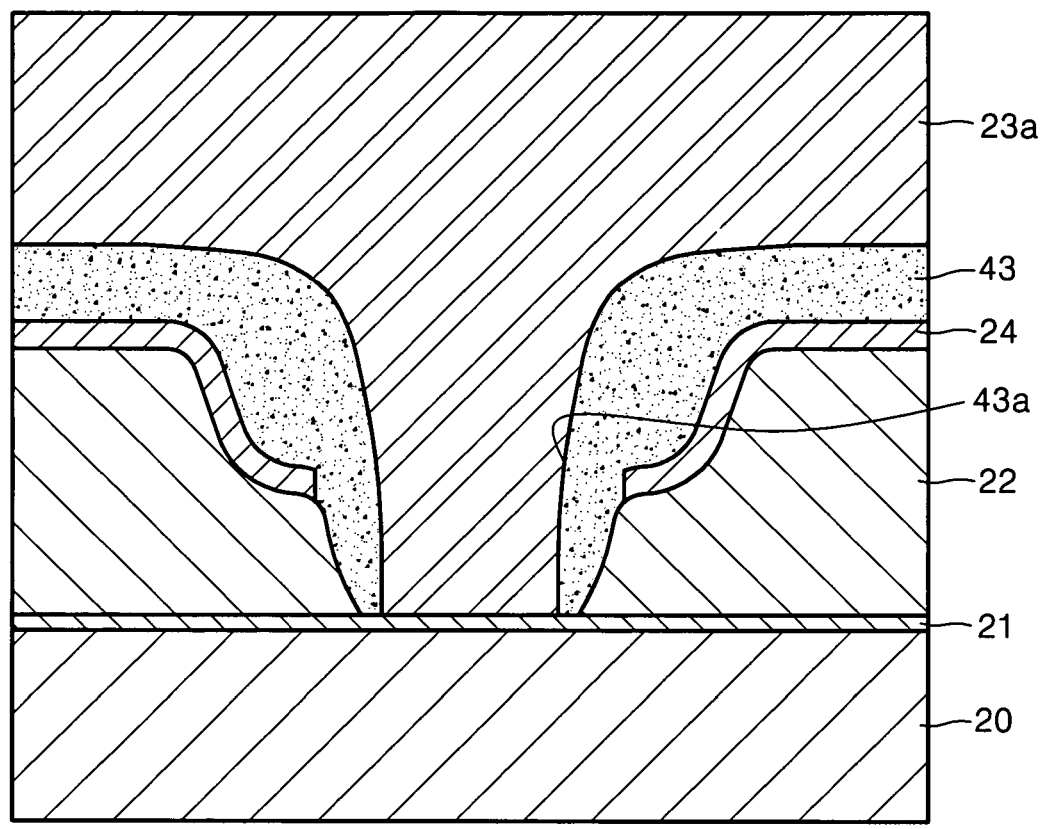

As shown in FIG. 6K, a CNT paste 23 containing photoresist is coated on the photoresist mask 43 using a printing method. As a result, the well-shaped window 43a is filled with the CNT paste 23.

Figure 6L:
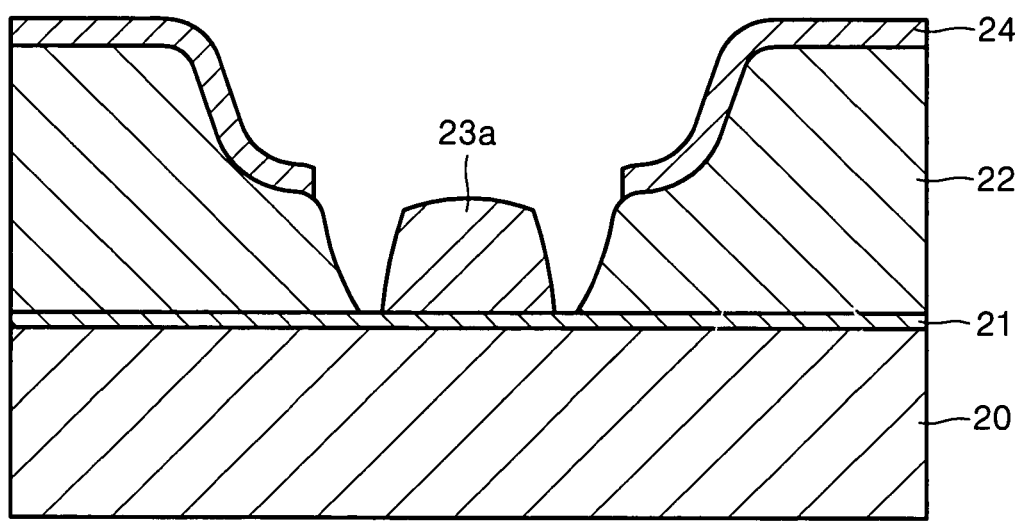

As shown in FIG. 6L, the CNT paste 23 is patterned by exposure and development processes to remove a portion of the CNT paste 23 at the edge of the well-shaped window 43a, thereby forming an electron emitter 23a in the center of the inside of the well-shape window 43a. A portion of the CNT paste 23 remaining on the photoresist mask 43 is removed by lifting up the photoresist mask 43.

An FED having a desired structure can be manufactured through the above-described processes.

Figure 7A:
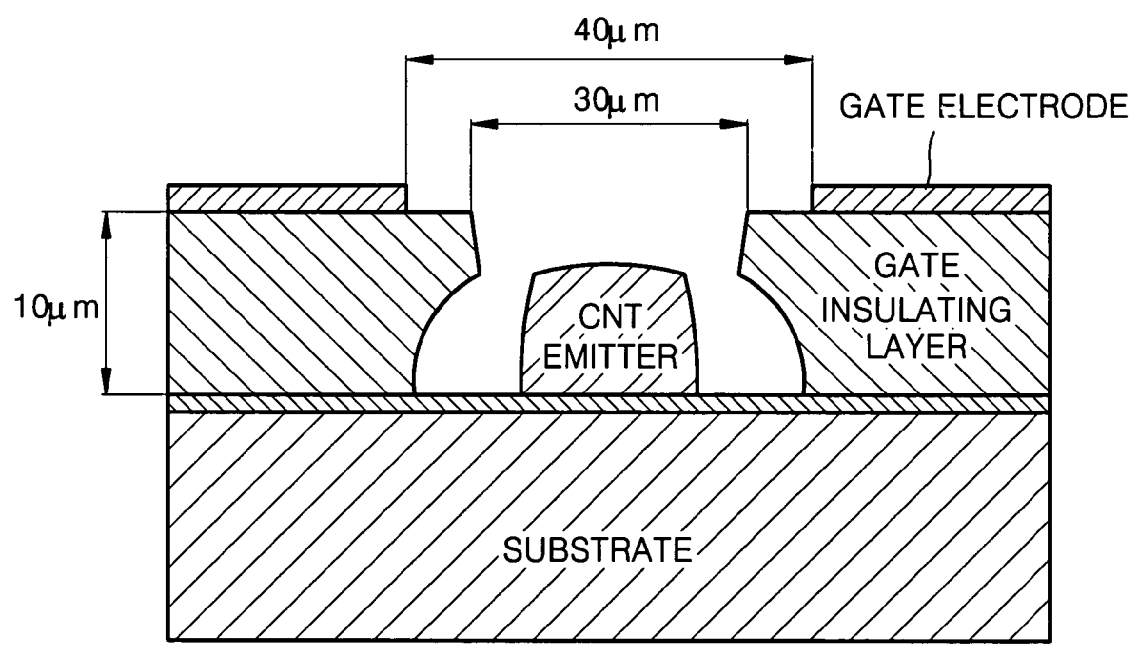

In order to observe effects of an FED having the above-described structure according to the present invention, simulations were carried out for a conventional FED shown in FIG. 7A and an FED of the present invention shown in 8A.

Figure 8A:
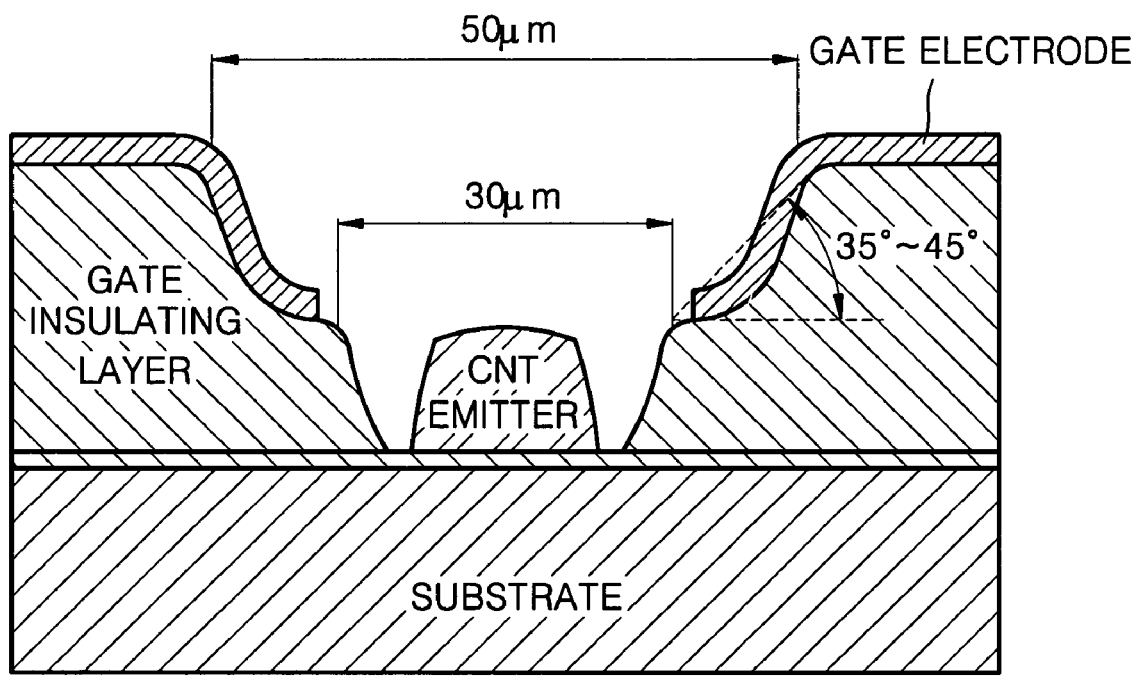

FIGS. 7B and 8B each illustrate enlarged portions around gate electrodes of the FEDs shown in FIG. 7A and 8A, and FIGS. 7C and 8C each illustrate trajectories of divergent electron beams around the gate electrodes of the FEDs shown in FIG. 7A and 8A. As can be seen in FIGS. 7C and 8C, in the FED of the present invention shown in FIG. 8C, the electron beam is focused at a narrower angle due to the gate electrode than in the conventional FED shown in FIG. 7C. When the electron beam diverges in the conventional FED shown in FIG. 7C, part of the electron beam is intercepted by the edge of the gate hole, which causes a leakage current from the gate electrode.

FIGS. 7D and 8D each illustrate trajectories of electron beams emitted from the FEDs shown in FIGS. 7A and 8A. As can be seen in FIGS. 7D and 8D, a radius of an electron beam emitted from the FED of the present invention shown in FIG. 8A is narrower than that of an electron beam emitted from the conventional FED shown FIG. 7A. According to calculation, the simulations showed that in embodiments of the present invention, electron beams reaching a front substrate on which an anode and a fluorescent material are formed are focused with an approximately 10% smaller width than in the conventional FED. Also, in the conventional FED, the width of a well of a gate insulating layer was limited to 30 microns due to the height of the gate insulating layer. However, in the FED according to the present invention, the width of a well of the first gate insulating layer 22' of a gate insulating layer can be adjusted by adjusting an area of the gate insulating layer to be etched. Thus, the well can be minutely formed to a width of 30 microns or less.

As described above, according to the present disclosure, since electron beams can be effectively focused, an FED having high color purity and brightness can be manufactured. Since the FED according to the present invention can form electron beams having a desired width using a single gate electrode, the FED of the present invention does not require a complicated double gate electrode. However, if the FED is desired to have higher color purity, brightness, and performance than existing double gate electrode type FEDs, a cylindrical electrode part, preferably a Bellmouse type electrode part, can be formed at a final gate electrode, i.e., a second gate electrode.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A field emission device comprising:
   a substrate;
   a cathode formed on the substrate;
   a gate insulating layer formed above the substrate and having a well exposing a portion of the cathode;
   an electron emitter formed on the exposed portion of the cathode; and
   a gate electrode formed on the gate insulating layer and having a gate hole corresponding to the well,
   wherein the gate electrode further includes a cylindrical electrode part that forms a focusing electric field from the gate hole toward a proceeding path of an electron beam emitted from the electron emitter and wherein said focusing electric field is axisymmetric with respect to a central axis of the electron beam.

2. The field emission device of claim 1, wherein the cylindrical electrode part is a Bellmouse shaped electrode part that broadens in the direction of propagation of the electron beam.

3. The field emission device of claim 1, wherein the electron emitter includes carbon nanotubes.

4. The field emission device of claim 2, wherein the electron emitter includes carbon nanotubes.

5. The field emission device of claim 1, wherein the field emission device has a double gate electrode in which an additional gate electrode is formed beneath a gate electrode on which the cylindrical electrode part is to be formed.

6. The field emission device of claim 2, wherein the field emission device has a double gate electrode in which an additional gate electrode is formed beneath a gate electrode on which the cylindrical electrode part is to be formed.

7. The field emission device of claim 1, wherein the electron emitter includes micro tips.

8. The field emission device of claim 1, wherein the electron emitter includes micro tips.

9. A field emission device comprising:
a substrate;
a cathode formed on the substrate;
a gate insulating layer formed above the substrate having a well exposing a portion of the cathode;
an electron emitter formed on the exposed portion of the cathode; and
a gate electrode formed on the gate insulating layer and having a gate hole corresponding to the well,
wherein the gate electrode further includes a cylindrical electrode part having one end closer to the substrate that has a smaller radius and another end further from the substrate having a larger radius, and a surface between the one and the other end such that upon application of an electric field, a converging electric lens is formed at a proceeding path of an electron beam emitted from the electron emitter and wherein said electric lens is axisymmetric with respect to a central axis of the electron beam.

10. The field emission device of claim 9, wherein the cylindrical electrode part is a Bellmouse shaped electrode part that broadens in the direction of propagation of the electron beam.

11. The field emission device of claim 9, wherein the electron emitter includes carbon nanotubes.

12. The field emission device of claim 10, wherein the electron emitter includes carbon nanotubes.

13. The field emission device of claim 9, wherein the electron emitter includes micro tips.

14. The field emission device of claim 10, wherein the electron emitter Includes micro tips.

15. The field emission device of claim 9, wherein the field emission device has a double gate electrode in which an additional gate electrode is formed beneath a gate electrode on which the cylindrical electrode part is to be formed.

16. The field emission device of claim 10, wherein the field emission device has a double gate electrode in which an additional gate electrode is formed beneath a gate electrode on which the cylindrical electrode part is to be formed.

* * * * *